United States Patent
Okita et al.

(10) Patent No.: US 6,657,748 B1
(45) Date of Patent: Dec. 2, 2003

(54) IMAGE READING APPARATUS, IMAGE READING METHOD, AND STORAGE MEDIUM

(75) Inventors: Hisao Okita, Kawasaki (JP); Mitsuru Amimoto, Yokohama (JP); Takashi Sakai, Kawasaki (JP); Kimihiko Fukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,056

(22) Filed: May 25, 1999

(30) Foreign Application Priority Data

| May 27, 1998 | (JP) | 10-145589 |
| May 28, 1998 | (JP) | 10-147465 |
| May 28, 1998 | (JP) | 10-147468 |

(51) Int. Cl.$^7$ ................................................. H04N 1/40
(52) U.S. Cl. ....................... 358/461; 358/474; 382/274
(58) Field of Search ............................. 358/461, 474, 358/494, 496, 497; 382/254, 274

(56) References Cited

U.S. PATENT DOCUMENTS 5,734,758 A * 3/1998 Yamamoto et al. ......... 382/274

FOREIGN PATENT DOCUMENTS

| JP | A1-157668 | 6/1989 |
| JP | A4-115777 | 4/1992 |
| JP | A5-300311 | 11/1993 |
| JP | A5-316341 | 11/1993 |

OTHER PUBLICATIONS

Japanese Patent Abstracts JPA1–157668; JPA4–11577; JPA5–300311 and JPA5–315341.

* cited by examiner

Primary Examiner—Thomas D. Lee
(74) Attorney, Agent, or Firm—Morgan & Finnegan, L.L.P.

(57) ABSTRACT

In an image reading apparatus, required capacity of a memory for storing shading correction data is reduced, as well as the width of a standard white board for generating the shading correction data is shortened. These are achieved by sequentially generating the shading correction data corresponding to respective R, G and B components, independently, to share a data storage area necessary for generating shading correction data, further, by reversing a scanning direction when scanning a standard white board while illuminating it with light of the respective color components on generating the shading correction data.

11 Claims, 11 Drawing Sheets

IMAGE READING APPARATUS, IMAGE READING METHOD, AND STORAGE MEDIUM

BACKGROUND OF THE INVENTION

The present invention relates to an image reading apparatus, image reading method, and storage medium and, more particularly to, an image reading apparatus, image reading method, and storage medium, capable of reading an image, obtained by, e.g., an optical scanner, converting the image into electric image signals by an image sensor, digitizing the electric image signals by an analog-digital (A/D) converter, and transferring the digitized signals to an external device, and a user-friendly image reading apparatus, image reading method, and storage medium capable of obtaining image data of good quality by constantly performing optimum shading correction by reducing undesirable effects caused by, e.g., deterioration of a light source.

Conventionally, an image reading apparatus capable of transferring image data to a host computer is provided with a white shading correction board. Using the shading correction board, so called shading correction for correcting variation in various characteristics of optical sub-system and variation in output signals from respective photoelectric conversion elements of an image sensor, thereby eliminating reading irregularity (spots), is commonly performed. Shading correction data for each color component used in the shading correction is usually generated as data of a single line by operating acquired data of several lines.

Further, in a conventional image reading apparatus, an on-period of a light source, such as an LED, used for reading a standard white board for shading correction, and shading correction data obtained on the basis of the read data are transferred to a host computer in advance and, when reading an image, the on-period of the light source and the shading correction data used as a reference level, for instance, are loaded down from the host computer, then shading correction is performed, using the shading correction data, on image data obtained by reading an original image while turning on the light source for the on-period.

Further, in the conventional reading apparatus, various image processings, such as shading correction, are applied to electric signals generated by scanning the original image. The shading correction data is generated each time an original is read, or in response to a manual instruction by a user when the user determines on the basis of deterioration of quality of a read image that the shading correction is necessary.

An example of a conventional image reading apparatus is explained below.

FIG. 11 is a block diagram illustrating a brief configuration of an image reading apparatus, such as an image scanner. In the image reading apparatus, digital image data is generated by processing signals outputted by an image sensor 1041 and outputted to a host computer 1048, such as a personal computer.

The image reading apparatus includes the image sensor 1041 which scans an original with light, receives reflected light from the original, and converts the light into analog electric signals, an analog circuit 1042 which processes the analog signals outputted from the image sensor 1041, an analog-digital (A/D) converter 1043 for converting analog image signals outputted from the analog circuit 1042 into digital image signals, a digital processing circuit 1044 for applying predetermined digital signal processes to the digital image signals, RAM 1045 for storing the processed digital image data, a CPU 1046 for controlling the overall operation of the image scanner 1041, and an interface unit 1047 for controlling an interface with an external device (host computer, in this case), as shown in FIG. 11.

In the apparatus shown in FIG. 11, when a command for reading an original is inputted from the host computer 1048, the CPU 1046 controls the image sensor 1041 to read a reference board in advance of reading an image area of the original, generates reference data, and stores the reference data in the RAM 1045. Thereafter, the CPU 1046 performs predetermined calculation based on the reference data and generates shading correction data, and stores the data in the RAM 1045. Then, the reading of the image area of the original is initiated as well as read image is corrected using the shading correction data.

In a case where the image reading apparatus does not generate shading correction data each time an original is read, a command for generating shading correction data is provided in a software installed on the host computer 1048, and the user instructs to generate the shading correction data by operating the host computer 1048 when necessary.

However, in an image reading apparatus adopting a line sequential reading method, data of only one color component out of three color components, namely, red (R), green (G) and blue (B), is acquired by reading a single line (acquired data is called "shading data" hereinafter); accordingly, in order to obtain shading data of all the three color components, it is necessary to scan an identical line three times. In addition, since it is necessary to acquire shading data of n lines (n is a positive integer, 2 or greater) for each color component, memory having a capacity of storing data of (n+1) lines×3 color components, where "1" corresponds to data of calculation result, is needed for generating shading correction data. Further, in a case of sharing a memory area for storing acquired shading data of n lines and sequentially generating shading correction data of the respective colors, the required capacity of the memory for generating shading correction data is to store data of (n+3) lines, namely, n lines of data of a single color component and generated shading correction data of the respective three color components. In this case, a white shading board having an effective area width corresponding to 3×n lines is necessary, which requires a space for accommodating the board, and makes it difficult to reduce the size of an image sensing apparatus.

Further, there is a problem in which proper shading correction is not performed using shading data loaded down from the host computer when the quantity of light illuminating an original has been changed due to, e.g., deterioration of a light source.

Further, it is necessary to read a reference board or a white board and generate reference data, then perform predetermined calculation by a CPU using the reference data in order to generate shading correction data, and write the shading correction data in the RAM in advance of reading an image. Therefore, if the shading correction data is generated each time an image is read, it takes extra time for generating the shading correction data in addition to reading the original.

Especially, when reading a color image, it is necessary to generate image data of the respective R, G and B color components, therefore, for generating shading correction data for the respective R, G and B color components, it takes three times longer than time for generating shading correction data for a black-and-white image. Furthermore, when a high-density image sensor is used, since a large number of pixels are arranged in the sensor, it requires longer time to generate the shading correction data.

Accordingly, it is stressful for a user if shading correction data is generated each time an original is read since it takes a longer time for reading the original.

Meanwhile, in a case where a user instructs to generate shading correction data by operating a computer, the user must evaluate deterioration of image quality, which requires that the user have a skill of a certain level and perform extra work.

SUMMARY OF THE INVENTION

The present invention has been made in consideration of the above situation, and has as its object to provide an image reading apparatus, an image reading method, and a storage medium capable of outputting image signals to which shading correction has been applied using a minimum memory area and a white shading correction board of a minimum width.

According to one aspect of the present invention, the foregoing object is attained by providing an image reading apparatus comprising: illumination means for irradiating light on an object; photoelectric conversion means for receiving light from the object and converting the received light into electric signals; optical means for guiding the light from the illumination means to the photoelectric conversion means via the object; moving means for relatively moving a part or all of the object, the illumination means, the optical means, and the photoelectric conversion means to obtain scan image information; and shading correction means for correcting reading unevenness due to variation in characteristics of the illumination means, the optical means, and the photoelectric conversion means, wherein, when acquiring shading data used for generating shading correction data, a reference member having a uniform reflection density is used as the object, and the photoelectric conversion means reciprocally reads the light from the reference member by reversing a scanning direction while performing moving operation by the moving means.

In accordance with the image reading apparatus of the present invention as described above, the illumination means irradiates light of three primary colors of R, G and B, and, when acquiring the shading data of respective R, G and B components, the reference member is used as the object, and the photoelectric conversion means reciprocally reads the light from the reference member while light sources for irradiating the R, G and B light are sequentially turned on in synchronization with the reversal of the scanning direction by the moving means.

Further, in accordance with the image reading apparatus of the present invention as described above, an optical color filter for generating light of R, G and B components is provided on a light path from the illumination means, wherein, when acquiring the shading data of respective R, G and B components, the reference member is used as the object, and the photoelectric conversion means reciprocally reads the light, from the reference member sequentially illuminated by the light of R, G and B components in synchronization with the reversal of the scanning direction by the moving means.

According to another aspect of the present invention, the foregoing object is attained by providing an image reading apparatus which reads an object by irradiating light on the object while a sensor for reading an image scans the object in a predetermined direction, receiving light from the object and converting the light into electric signals, the apparatus comprising: shading correction means for correcting reading unevenness due to sensitivity variation on reading elements of the sensor; and control means for controlling scanning operation and reading operation of the sensor so as to reciprocally read an identical target data area while reversing a scanning direction of the sensor when acquiring shading data, used for generating shading correction data, by the sensor.

In accordance with the image reading apparatus of the present invention as described above, the light irradiated on the object is preferably light of three primary colors of R, G and B, and, when acquiring the shading data, the scanning operation is performed in a predetermined direction a same number of times as a number of the primary colors in response to turning-on operation of light sources of the respective colors.

Further, in accordance with the image reading apparatus of the present invention as described above, light irradiated on the object is light of three primary colors of R, G and B using a predetermined color filter, and, when acquiring the shading data, the shading data of the respective colors is sequentially read in synchronization with the scanning operation, corresponding to the respective colors, in the predetermined direction.

According to still another aspect of the present invention, the foregoing object is attained by providing an image reading method for reading an image of an object in which the object is illuminated while a sensor for reading an image scans the object in a predetermined direction, light from the object is received and converted into electric signals, the method comprising the steps of: correcting reading unevenness due to a sensitivity variation on reading elements of the sensor; and controlling scanning operation and reading operation of the sensor so as to reciprocally read an identical target data area while reversing a scanning direction of the sensor when acquiring shading data, used for generating shading correction data, by the sensor.

In accordance with the method of the present invention as described above, it is preferable to irradiate light of three primary colors of R, G and B on the object and perform the scanning operation in a predetermined direction a same number of times as a number of the primary colors in response to turning-on operation of light sources of the respective colors when acquiring the shading data.

Further, in accordance with the method of the present invention as described above, light of three primary colors of R, G and B is irradiated on the object, and, when acquiring the shading data, the shading data of the respective colors may be sequentially read in synchronization with the scanning operation, corresponding to the respective colors, in the predetermined direction.

According to still another aspect of the present invention, the foregoing object is attained by providing a storage medium for storing program codes which cause a computer to perform the respective means of any one of the image reading apparatuses as described above.

According to still another aspect of the present invention, the foregoing object is attained by providing a storage medium for storing program codes which cause a computer to execute any one of the image reading methods as described above.

In accordance with the present invention as described above, when light sources of the three primary colors, namely, R, G and B, are turned on, for instance, while moving an optical sub-system which includes the illumination means, the optical means, and photoelectric conversion means in the normal reading direction, the illumination means irradiates light onto a reference member and the photoelectric conversion means receives the reflected light from the reference member, and shading data of R component is obtained, first. Thereafter, the same area of the reference member illuminated for obtaining the shading data of R component is illuminated to obtain shading data of G component while moving the optical sub-system in the direction opposite to the normal reading direction. Then, shading data of B component is obtained while moving the optical sub-system in the normal reading direction again. After that, reading of an original is initiated. Each time the shading data of each color component is acquired, shading correction data of the color component is sequentially generated.

In the aforesaid manner, the required capacity of memory for generating shading correction data is to store n lines of acquired shading data of a single color component and shading correction data of a single line for each of the respective color components. In short, the required memory capacity for generating shading correction data is to store data of (n+3) lines.

Further, the optical sub-system reciprocally scans the reference member, such as a white shading correction board, to acquire the shading data of the R, G and B color components, thus, the reference member needs to have a width large enough to include n lines of area where the optical sub-system can scan. Accordingly, it is possible to reduce the size of the apparatus.

It is another object of the present invention to provide an image reading apparatus, an image reading method, and a storage medium, capable of performing proper shading correction when deterioration of a light source, which affects reading of image data, occurs.

According to one aspect of the present invention, the foregoing object is attained by providing an image reading apparatus capable of storing on-period data for a light source for irradiating light on an original and shading correction data for image data acquired by reading the original, in an external device, loading down the shading correction data from the external device at a beginning of image reading operation, and performing shading correction using the down-loaded shading correction data on the image data, the apparatus comprising: on-period control means for controlling an on-period of the light source in accordance with the on-period data down-loaded from the external device; reference member reading means for reading light from a reference member illuminated with the light from the light source; and comparison means for comparing a level of a read signal outputted from the reference member reading means to a reference level of the shading correction data loaded down from the external device.

According to another aspect of the present invention, the foregoing object is attained by providing an image reading apparatus including: photoelectric conversion means for converting light from an original illuminated with light from a light source into electric signals; shading correction means for applying shading correction on the electric signals outputted from the photoelectric conversion means; a reference member used for acquiring shading correction data used for the shading correction performed by the shading correction means; communication means for communicating with an external device; and transmission means for transmitting on-period data for the light source and shading correction data obtained by the shading correction means to the external device, the apparatus comprising:

correction data down-loading means for loading down the on-period data for the light source and the shading correction data set in the external device; on-period control means for controlling a turn-on/off operation of the light source on the basis of the on-period data loaded down by the correction data down-loading means; reference member reading means for reading the light from the reference member illuminated by the light from the light source; and comparison means for comparing a level of a read signal outputted from the reference member reading means to the shading correction data loaded down from the external device.

In the apparatus having the above configuration it is preferable to further comprise correction data setting means for transmitting an error signal to the external device as well as setting on-period data for the light source and shading correction data to the external device when it is determined by the comparison means that the level of the read signal outputted from the reference member reading means is lower than the signal level of the shading correction data loaded down from the external device.

According to still another aspect of the present invention, the foregoing object is attained by providing an image reading method capable of storing on-period data for a light source for irradiating light on an original and shading correction data for image data acquired by reading the original, in an external device, loading down the shading correction data from the external device at a beginning of image reading operation, and performing shading correction using the down-loaded shading correction data on the image data, the method comprising the steps of: controlling a turn-on/off operation of the light source in accordance with the on-period data down-loaded from the external device; reading light from a reference member illuminated with the light from the light source; and comparing a level of a read signal acquired in the reading step to a reference level of the shading correction data loaded down from the external device.

According to still another aspect of the present invention, the foregoing object is attained by providing an image reading method including the steps of: converting light from an original illuminated with light from a light source into electric signals; applying shading correction on the electric signals; communicating with an external device; and acquiring shading correction data used for the shading correction by reading light from a reference member, the method comprising the steps of: loading down on-period data for the light source and shading correction data set in the external device; controlling a turn-on/off operation of the light source on the basis of the down-loaded on-period data; reading the light from the reference member illuminated by the light from the light source; and comparing a level of a read signal acquired in the reading step to the shading correction data loaded down from the external device.

In the aforesaid method, it is preferable to further comprise a step of transmitting an error signal to the external device as well as setting on-period data for the light source and shading correction data to the external device when it is determined as a comparison result that the level of the read signal outputted from the reference member reading means is lower than the signal level of the shading correction data loaded down from the external device.

According to still another aspect of the present invention, the foregoing object is attained by providing a storage medium for storing program codes which cause a computer to perform the respective means of any of the image reading apparatuses as described above.

According to still another aspect of the present invention, the foregoing object is attained by providing a storage medium for storing program codes which cause a computer to execute any of the image reading methods as described above.

In accordance with the present invention as described above, after the apparatus is turned on and operation is initiated, an on-period of a light source and shading correction data which are set in an external device in advance are loaded down, and a reference level of the down-loaded shading correction data and a level of a signal newly obtained by reading reflected light from the reference member are compared.

In accordance with the present invention, it is preferable to transmit an error signal to the external device as well as set on-period data for the light source and shading correction data to the external device when it is determined that the level of the acquired signal by reading reflected light from the reference member is lower than the signal level of the shading correction data loaded down from the external device.

It is still another object of the present invention, to provide an image reading apparatus, an image reading method, and a storage medium capable of preventing image reading speed from being reduced caused by generating shading correction data for each image reading operation as well as generating shading correction data at proper timing without bothering a user.

According to one aspect of the present invention, the foregoing object is attained by providing an image reading apparatus comprising: photoelectric conversion means for converting an image read by scanning an original with light into analog electric signals; A/D conversion means for converting the analog electric signals outputted from the photoelectric conversion means into digital image data; image processing means for applying predetermined image processing to the digital image data outputted from the A/D conversion means; correction data generation means for generating shading correction data for performing shading correction on the digital image data by scanning and reading a reference original or a white board; correction data storage means for storing the shading correction data generated by the correction data generation means; correction means for performing the shading correction on the basis of the shading correction data generated by the correction data generation means; determination means for determining whether or not to generate the shading correction data; and control means for controlling whether or not to make the correction data generation means generate shading correction data, on the basis of a determination result by the determination means.

The determination means may have read number storage means for storing a number of times image reading operation is performed, and determines whether or not to generate the shading correction data on the basis of the number of times image reading operation is performed stored in the read number storage means.

Alternatively, the determination means may have time measurement means for measuring time elapsed since shading correction data has been generated last time, and determines whether or not to generate the shading correction data on the basis of a measurement result by the time measurement means.

According to another aspect of the present invention, the foregoing object is attained by providing an image reading method comprising the steps of: converting an image read by scanning an original with light into analog electric signals; converting the analog electric signals acquired by performing photoelectric conversion into digital image data; applying predetermined image processing to the digital image data; generating shading correction data for performing shading correction on the digital image data by scanning and reading a reference original or a white board; storing the generated shading correction data in a storage medium; performing the shading correction on the basis of the generated shading correction data; determining whether or not to generate the shading correction data; and controlling whether or not to generate shading correction data on the basis of a determination result.

In the determination step, a number of times image reading operation is performed may be stored in the storage medium, and whether or not to generate the shading correction data may be determined on the basis of the number of times image reading operation is performed stored in the storage medium.

Further, in the determination step, time elapsed since shading correction data was generated last time may be measured, and whether or not to generate the shading correction data may be determined on the basis of a measurement result.

According to still another aspect of the present invention, the foregoing object is attained by providing a storage medium for storing program codes which cause a computer to perform the respective means of any of the image reading apparatuses as described above.

According to still another aspect of the present invention, the foregoing object is attained by providing a storage medium for storing program codes which cause a computer to execute any of the image reading methods as described above.

In accordance with the present invention as described above, the shading correction data is automatically generated only when it is necessary to generate it for performing optimum shading correction.

The invention is particularly advantageous since it is possible to output image signals to which shading correction has been applied using a minimum memory area and a white shading correction board of a minimum width.

Further, when the level of a read signal does not reach a predetermined level because of deterioration of an LED, for instance, such cases can be detected. Accordingly, deterioration of the quality of a read image due to lack of illumination light is properly prevented; thus a proper shading correction is always performed and preferable image data can be obtained.

Furthermore, in a case where it is not proper to use shading correction data stored in an external device, the data is automatically updated, thereby latest shading correction data is always stored in the external device.

Further, new shading correction data is automatically generated only when the new data is needed, thus, it is possible to prevent time from being wasted for generating unnecessary shading correction data. Accordingly, throughput of an image reading operation is increased.

Further, the load on a user of making a decision on whether or not to generate shading correction data is reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below in accordance with the accompanying drawings.

Below, a few embodiments are explained.

First Embodiment

Figure 1A:
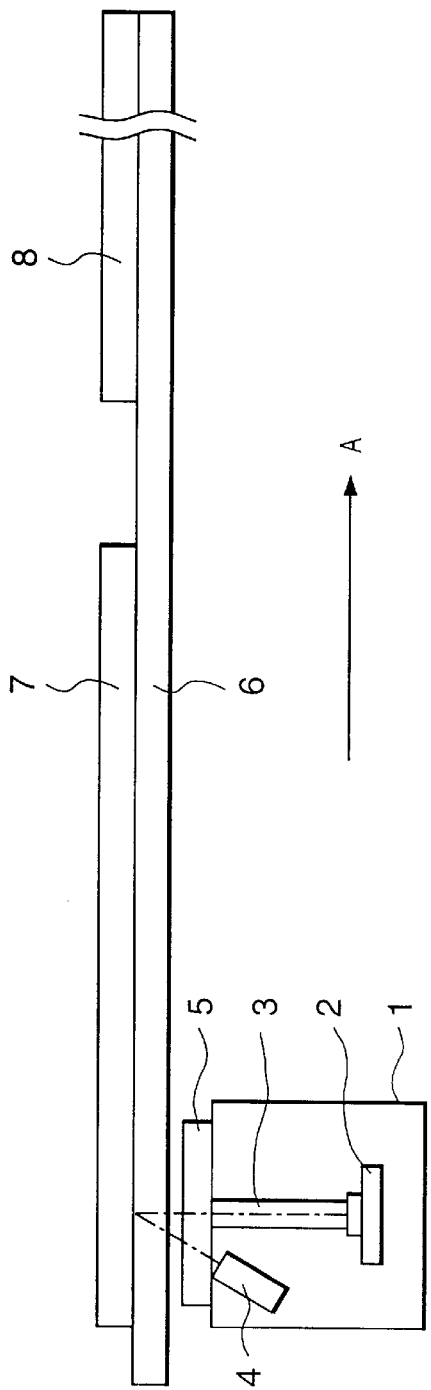
FIGS. 1A and 1B are views showing a brief configuration and operation of an image reading apparatus according to a first embodiment of the present invention.

FIG. 1A is a sectional side elevation showing an internal configuration of an image reading apparatus according to the first embodiment of the present invention.

In FIG. 1A, reference numeral 1 denotes a contact-type image sensor (referred to as "CIS" hereinafter) for reading a surface of an original, and the CIS 1 is configured with a photodiode 2, a self focusing rod lens 3, an LED array 4, and a contact glass 5. An optical sub-system is configured with the CIS 1 as described above. Further, a white shading board 7, which is a reference member, is adhered to a platen glass 6. The CIS 1 has a reading width which is approximately the same as the width of the short side of the platen glass 6 (in a direction normal to the sheet of FIG. 1). By electrically scanning an original in the direction parallel to the short side (called "main scanning direction" hereinafter) while moving the CIS 1 in the direction of an arrow A (called "sub-scanning direction" hereinafter), the image on the original is read.

Note that the position of the CIS 1 shown in FIG. 1A is defined as an initial position.

Figure 1B:
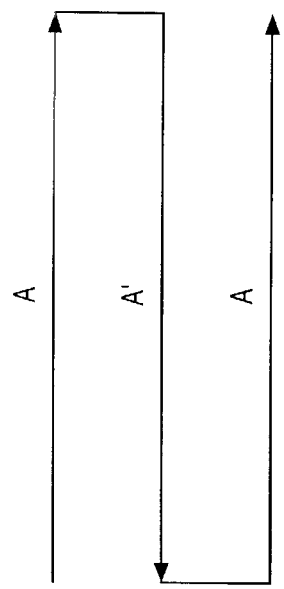

FIG. 1B is a view showing an image reading sequence when generating shading correction data, which will be explained later, and the moving direction of the CIS 1 is shown. More specifically, an original 8 is placed on the platen glass 6, and a reading operation is performed while reciprocally moving the relative position of the CIS 1 in the sub-scanning direction, as shown by an arrow in FIG. 1B, with respect to the white shading board 7 and the original 8.

Therefore, as seen in FIGS. 1A and 1B, the white shading board 7 is provided in a narrow area between the initial position of the CIS 1 and the original 8.

In the following explanation, moving direction of the CIS 1 indicated by the arrow A is called "forward direction", and the moving direction indicated by an arrow A' is called "backward direction".

Figure 2:
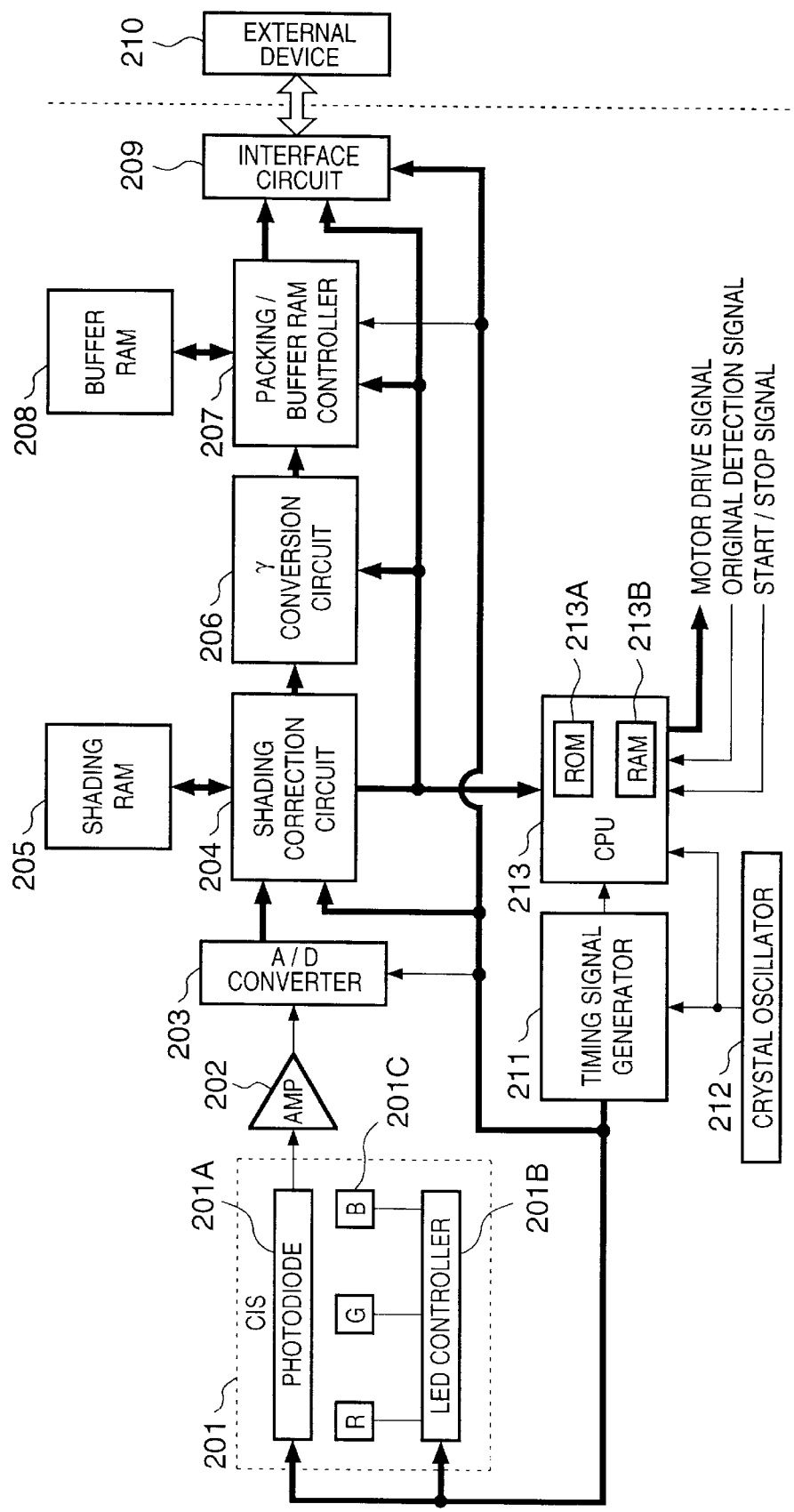
FIG. 2 is a block diagram illustrating an electrical configuration of the image reading apparatus according to the first embodiment of the present invention.

FIG. 2 is a block diagram illustrating an electrical configuration of the image reading apparatus according to the first embodiment of the present invention. Below, an operation of the image reading apparatus is explained with reference to FIG. 2.

In FIG. 2, reference numeral 201 denotes a CIS, which corresponds to the CIS 1 shown in FIG. 1, for reading the original 8. Photodiodes 201A and LEDs 201C as light sources of respective colors (R, G and B) are integrally formed on the CIS 201. By controlling the LEDs 201C by an LED controller 201B to sequentially turn on the R, G and B LEDs 201C for each scan line, while moving the CIS 201 along the surface of the original, R, G and B color images are sequentially obtained by line.

Note, it is possible to use an LED which emits white light in place of the R, G and B LEDs 201C. In this case, optical color filters each of which selectively transmits R, G or B color, are provided on a light path between the LED and the original. With the above configuration, an image is obtained in the same manner as described above by reading color images of the respective colors sequentially.

Further, reference numeral 202 denotes an amplifier for amplifying a signal outputted from the CIS 201; and 203, an A/D converter for converting the output from the amplifier 202 to, e.g., an 8-bit digital signal for each color component for each pixel.

Shading RAM 205 is a memory for storing shading data obtained by reading reflected light from the white shading board 7 in advance as well as shading correction data obtained by performing operation on the basis of the shading data, and a shading correction circuit 204 performs shading correction on read image signals on the basis of the shading correction data stored in the shading RAM 205.

A γ conversion circuit 206 performs γ conversion on the read image data in accordance with a γ curve set by a host computer (shown as an external device 210 in FIG. 2) in advance.

Buffer RAM 208 is for temporary storing image data for adjusting timing between a reading operation and communication with the host computer. A packing/buffer RAM controller 207 performs packing processing in accordance with an image output mode (binary, 4-bit multi-value, 8-bit multi-value, 24-bit multi-value) set by the host computer in advance, thereafter, writes packed data to the buffer RAM 208. Further, the packing/buffer RAM controller 207 reads image data from the buffer RAM 208 and outputs it to an interface circuit 209.

The interface circuit 209 receives control signals and outputs image signals from/to the external device 210, such as a personal computer, which functions as a host computer of the image read apparatus.

Reference numeral 213 denotes a CPU having a form of, e.g., a microcomputer, which includes ROM 213A storing a processing program, and RAM 213B for providing a work area. The CPU 213 controls respective units of the apparatus by executing the program stored in the ROM 213A.

Reference numeral 212 denotes a crystal oscillator, for instance, and reference numeral 211 denotes a timing signal generator for generating various timing signals, which are reference signals of various operations, by dividing the output from the crystal oscillator 212.

Figure 3:
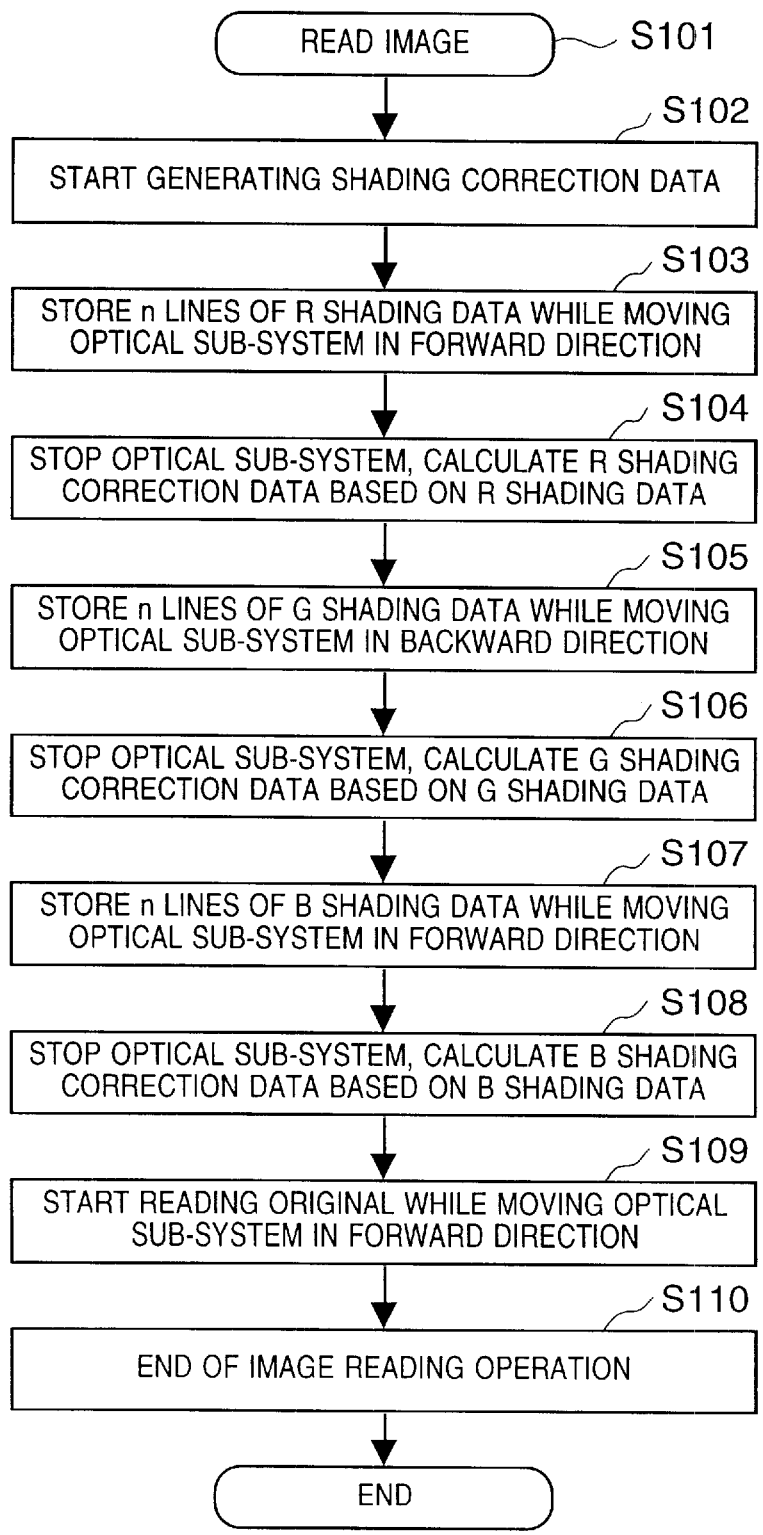
FIG. 3 is a flowchart showing processing operation of the image reading apparatus according to the first embodiment of the present invention.

Next, control processing of a reading operation performed by the image reading apparatus is explained with reference to a flowchart shown in FIG. 3.

When the host computer transmits an original read command to the image reading apparatus (S101), the image reading apparatus starts generating shading correction data (S102). First, by reading the white shading board 7 by the optical sub-system, i.e., the CIS 201, while moving in the direction receding from the initial position (forward direction) and illuminating the board 7 with a R light source, n lines of shading data of R component (R shading data) are stored in memory (shading RAM 205) (S103). After storing the R shading data, the optical sub-system is stopped, and a single line of shading correction data of R component is calculated (S104).

Thereafter, the white shading board 7 is read again by the optical sub-system while moving in the direction approaching the initial position (backward direction) and illuminating the board 7 with a G light source, n lines of shading data of G component (G shading data) is stored in the memory (S105). After storing the G shading data, the optical sub-system is stopped, and a single line of shading correction data of G component is calculated (S106).

Thereafter, the white shading board 7 is read again by the optical sub-system while moving in the forward direction from the initial position and illuminating the board 7 with a B light source, n lines of shading data of B component (B shading data) is stored in the memory (S107). After storing the B shading data, the optical sub-system is stopped, and a single line of shading data of B component is calculated (S108). Then, the optical sub-system is further moved in the forward direction from the stopped position and start reading an original (S109), and the image reading operation is completed (S110).

According to the image reading apparatus according to the first embodiment as described above, by using a memory area which is enough to store (n+3) lines of data in the shading RAM 205, it is possible to generate shading correction data; therefore, it is possible to transmit image signals to which shading correction has been applied using a minimum memory area for shading correction and a shading board of a minimum width.

More specifically, when generating the shading correction data for the three color components at once using an image reading apparatus which reads an A4-size document in a resolution of 300 dpi and obtains 8-bit shading data for each color component for each pixel, as described as a conventional example, if n (=5) lines of shading data is acquired to calculate a single line of shading data, the capacity, $$8 \times 2552 \text{ pixels} \times (5 \text{ lines} + 1 \text{ line}) \times 3 \approx 45 \text{ KB}$$

is required in a memory for shading correction.

By contrast, according to the first embodiment, since a memory area is shared by the three color components, the capacity required for acquiring n=5 lines of shading data and shading correction data under the same conditions is $$8 \times 2552 \text{ pixels} \times (5 \text{ lines} + 1 \text{ line} \times 3) \approx 20 \text{ KB}.$$

Therefore, memory of small capacity is enough to serve as a shading RAM, thus, it is possible to reduce manufacturing cost.

Further, in a case of acquiring shading data of three color components without changing reading direction of the white shading board 7, if a reading resolution is 300 dpi, the width of a readable area of the white shading board 7 per line is 85 $\mu$m. Therefore, for calculating shading correction data of a single line on the basis of shading data of n=5 lines, a white shading board having the width of a readable area, $$85 \text{ } \mu\text{m} \times 5 \text{ lines} \times 3 \text{ colors} \approx 1.3 \text{ mm}$$

is necessary in the sub-scanning direction. By contrast, according to the first embodiment, since the area for acquiring shading data of n=5 lines can be shared by three color components, the required width of the readable area of the white shading board in the sub-scanning direction is, $$85 \text{ } \mu\text{m} \times 5 \text{ lines} \approx 0.4 \text{ mm}$$

Accordingly, it is possible to reduce the size of the apparatus in the sub-scanning direction.

Modification 1

Note, in the first embodiment as described above, the optical sub-system is temporarily stopped while calculating the shading correction data, however, it is possible to acquire shading data of the next color component while operating the shading data previously obtained (e.g., when acquiring G shading data, R shading data is operated, and when operating B shading data, G shading data is operated).

By operating as described above, it is possible to further shorten a period taken for generating shading correction data.

Modification 2

Further, in the first embodiment, the initial position (home position) of the optical sub-system is set on the leading-edge side of the white shading board (the left side of the board in FIG. 1B), however, the initial position may be set between an intermediate position between the white shading board and the original. In such cases, R shading data is obtained while moving the optical sub-system in the backward direction, G shading data is obtained while moving the optical sub-system in the forward direction, and B shading data is obtained while moving the optical sub-system in the backward direction, then, an original is read as moving the optical sub-system in the forward direction.

Modification 3

Further, in the first embodiment, a contact-type image sensor is used as the sensor for reading an original, however, a conventional CCD image sensor may be used instead.

Modification 4

Further, in the first embodiment, shading data is generated in the order of R, G and B components, however, the order of color components may be arbitrarily changed.

Second Embodiment

As for an apparatus and its configuration elements in the second embodiment, the same units and elements as those explained in the first embodiment are referred to by the same reference numerals, thus explanation of them is omitted, and only characteristic configuration elements and their operations are explained below.

Figure 4:
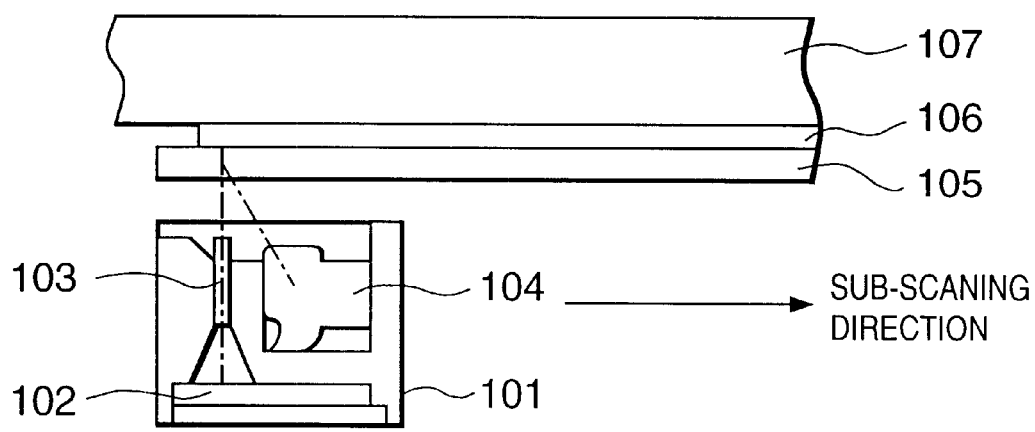
FIG. 4 is a view illustrating a brief internal configuration of an image reading apparatus according to a second embodiment of the present invention.

FIG. 4 is a sectional side elevation showing a part of a configuration of an image reading apparatus according to the second embodiment of the present invention. A contact-type image sensor (CIS) 101 shown in FIG. 4 includes photodiodes 102, a self focusing rod lens array 103, an LED (not shown), and a light guide 104.

When the image reading apparatus reads an original 106 placed on a platen 105 and pressed against the platen 105 by a standard white board 107, the light guide 104 guides light emitted by the LED and illuminates the original with the guided light, and the photodiode 102 receives light reflected by the original while moving the contact-type image sensor (CIS) 101 in the sub-scanning direction, indicated by an arrow in FIG. 4, by a driving motor (not shown), thereby an original image is read.

Figure 5:
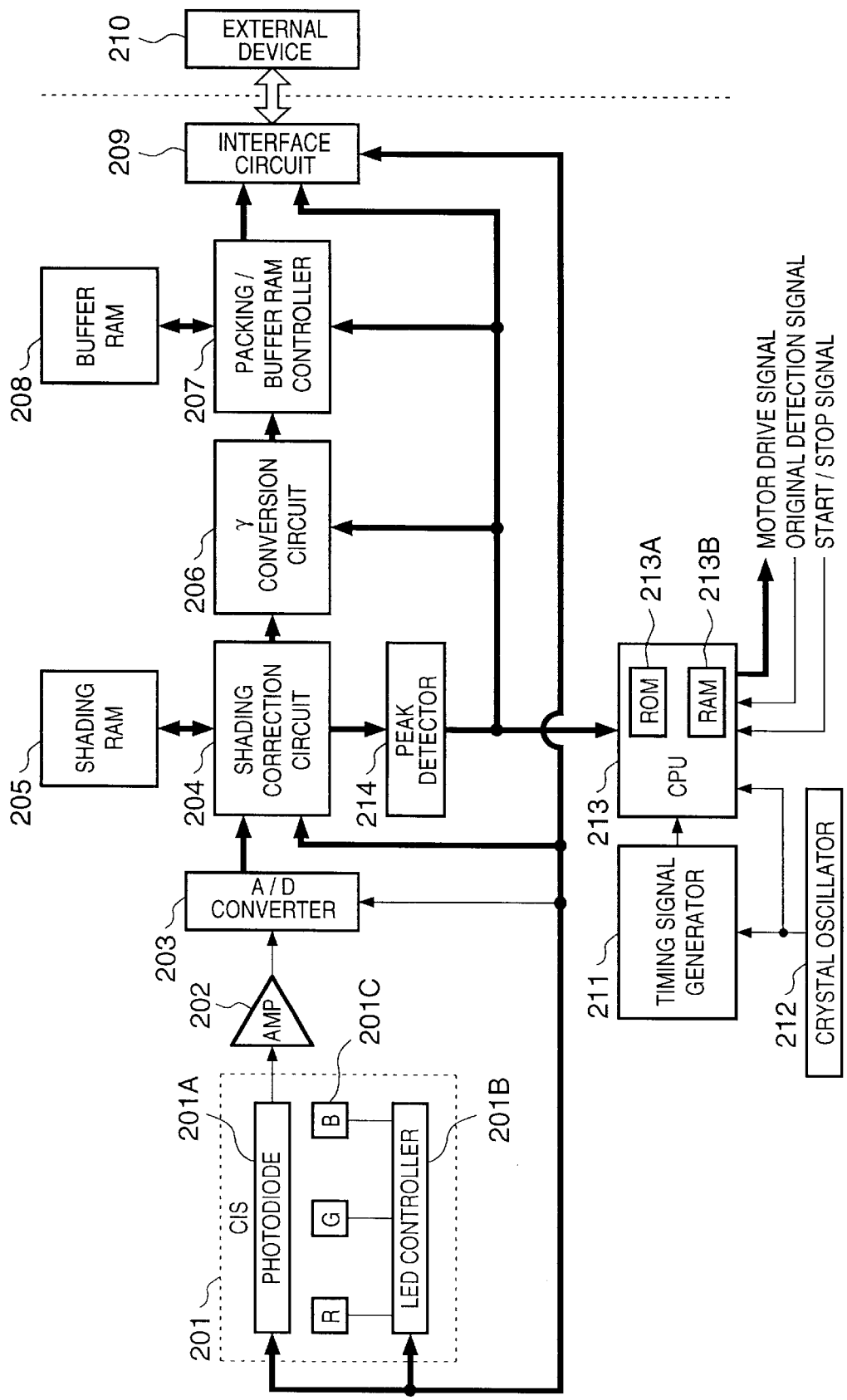
FIG. 5 is a block diagram illustrating an electrical configuration of the image reading apparatus according to the second embodiment of the present invention.

FIG. 5 is a block diagram illustrating an electrical configuration of the image reading apparatus according to the second embodiment. Below, the circuit configuration of the image reading apparatus is explained with reference to FIG. 5.

A peak detector 214 detects the peak value of image data for each scan line, and is used for detecting a reading edge of an original to be read.

Figure 6:
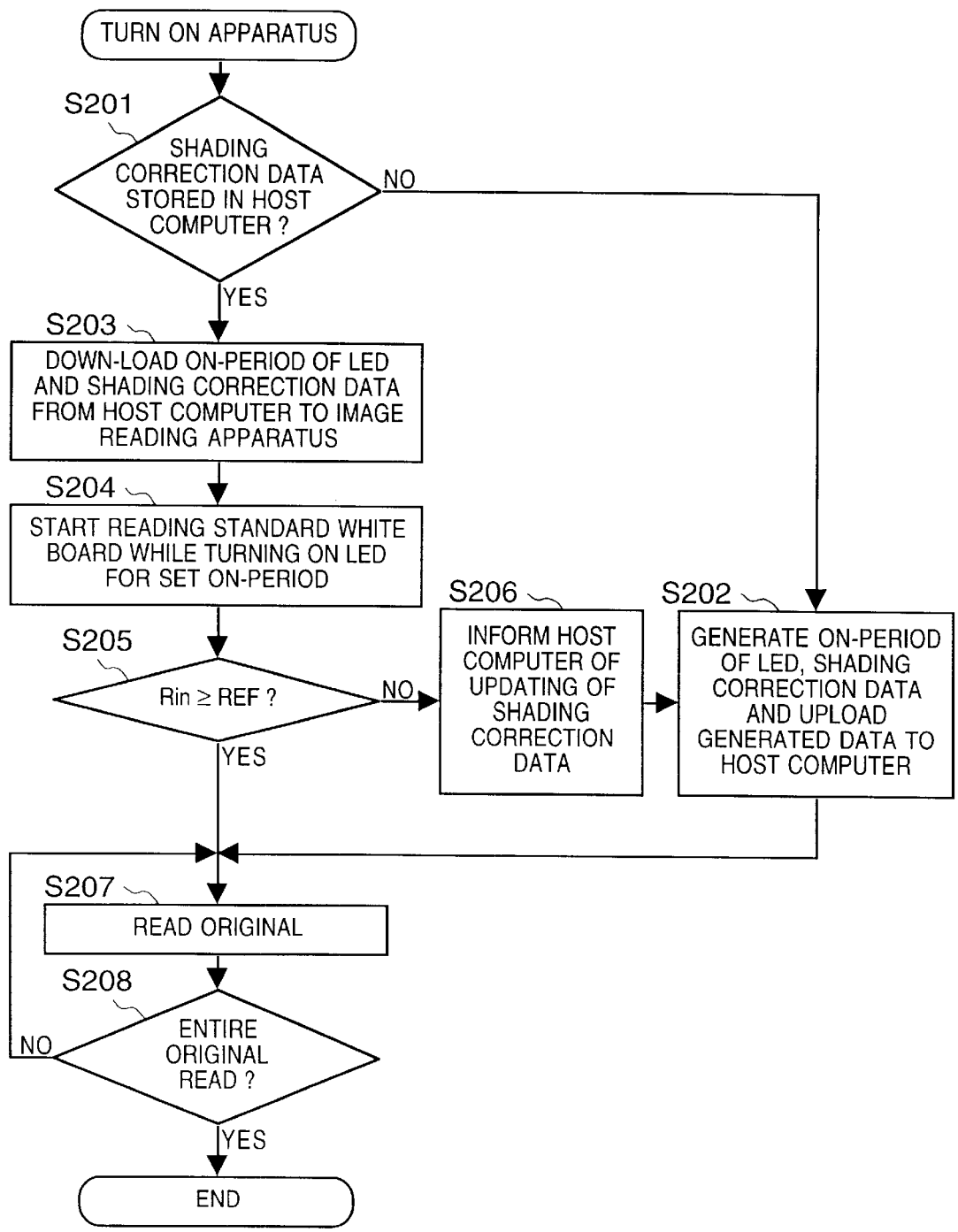
FIG. 6 is a flowchart showing processing operation of the image reading apparatus according to the second embodiment of the present invention.

Next, referring to a flowchart shown in FIG. 6, shading correction operation performed by the image reading apparatus according to the second embodiment is explained.

When the image reading apparatus is turned on, whether or not an on-period of the LED and shading correction data are stored in a host computer, i.e., the external device 210, is checked (S201). If it is determined in step S201 that the on-period of the LED and the shading correction data are not stored in the host computer 210, an on-period of the LED and shading correction data are generated in the image reading apparatus and the generated data are uploaded to the host computer 210 (S202).

Whereas, if it is determined in step S201 that the on-period of the LED and the shading correction data are stored in the host computer 210, then these data are loaded down from the host computer 210 (S203).

Then, in accordance with the on-period of the LED set in the image reading apparatus, the LED controller 201B is controlled so as to sequentially turn on the LEDs 201C of respective colors, i.e., the light source, by each line in the main scanning direction, thereby the standard white board 107 is illuminated and R, G and B color images are sequentially obtained by line (S204).

Next, whether or not a read signal level (Rin) of the standard white board 107 is equal to or greater than a reference level (REF) of the shading correction data loaded down from the host computer 210 is determined (S205)

If Rin<REF, then it is determined that that read signal level is lower than the reference level, and the image reading apparatus informs the host computer 210 of updating the on-period of the LED and the shading correction data (e.g., transmits an error signal) (S206), thereafter, the on-period of the LED and the shading correction data are newly generated (S202).

Whereas, if Rin≧REF, it is determined that the read signal level is equal or greater than the reference level (REF) of the shading correction data loaded down from the host computer 210, then the shading correction data is stored in shading RAM 205 and the original is read to obtain image data (S207).

Finally, whether or not the reading of the original is completed is determined (S208). If it is determined that the reading operation is not completed, the process returns to step S207 and the rest of the original is read. When the completion of the reading operation is confirmed, the entire processing is completed.

According to the second embodiment as described above, whether or not to use the shading correction data loaded down from the host computer is determined on the basis of the signal level acquired by reading the standard white board in advance of reading an original, and, if it is determined not to use the down-loaded shading correction data, an on-period of the LED and shading correction data are newly generated. Accordingly, optimum shading correction is always performed in response to change in reading conditions, such as deterioration of a light source.

Note, a contact-type image sensor is used as the image reading sensor in the second embodiment, however, a conventional CCD image sensor may be used instead.

Third Embodiment

Figure 7:
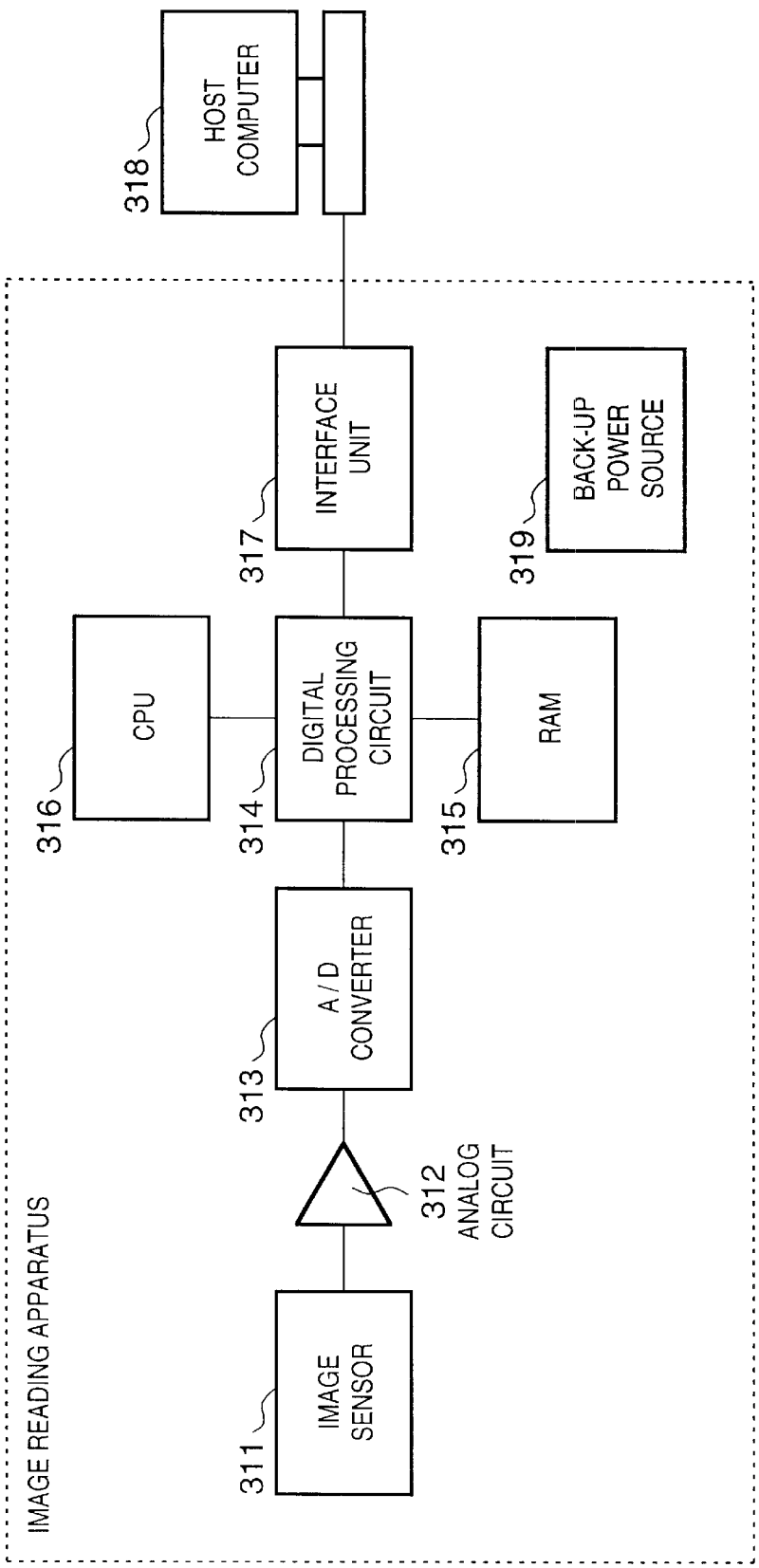
FIG. 7 is a block diagram illustrating an electrical configuration of an image reading apparatus according to a third embodiment of the present invention.

FIG. 7 is a block diagram illustrating a configuration of an image reading apparatus according to the third embodiment of the present invention.

Referring to FIG. 7, when the image reading apparatus transmits an analog image signal from an image sensor 311 to an analog circuit 312, the analog circuit 312 applies analog processes, such as offset adjustment and signal amplification, to the analog image signal inputted from the analog image sensor 311 and transmits the resultant image signal to an A/D converter 313.

The A/D converter 313 converts the analog image signal inputted from the analog circuit 312 into a digital image signal, and outputs the digital image signal to a digital processing circuit 314. The digital processing circuit 314 applies predetermined signal processes on the digital image signal inputted from the A/D converter 313 under control of a CPU 316, then transmits processed digital image data to an interface unit 317. The interface unit 317 outputs the input digital image data to the host computer 318 in accordance with a predetermined communication protocol.

Note, in FIG. 7, reference numeral 319 denotes a back-up power source for providing electric energy so as to continue measuring time using a clock in the CPU 316 even when external power supply is stopped. If the measurement of time while the external power supply is stopped is not needed, the back-up power source may be omitted.

In the image reading apparatus configured as above, when the image reading apparatus receives an image read command from a host computer 318, it checks the number of times the reading operation is ordered since shading correction data is generated last time in advance of initiating the image reading operation, and whether or not the number of times exceeds a reference value is determined.

If the number of times exceeds the reference value, then it is determined that the shading correction data is less reliable since change in conditions of the image reading apparatus is highly possible as the image reading apparatus is used longer. In this case, the CPU 316 control s the image sensor 311 to scan a reference board (not shown), generates reference data, and stores the data in RAM 315, thereby the previous shading correction data stored in the RAM 315 is updated by new shading correction data. Thereafter, an image reading operation is initiated, and an original is kept read while performing shading correction on the read image data based on the updated shading correction data.

Whereas, if the number of times does not exceed the reference value, it is determined that proper shading correction can be performed using the previous shading correction data without generating new shading correction data this time. In this case, new shading data is not generated, and image reading operation is performed.

There are various methods for controlling generation timing of new shading correction data, and some of them are explained below.

(1) Control Based on the Number of Image Reading Operations

Figure 8:
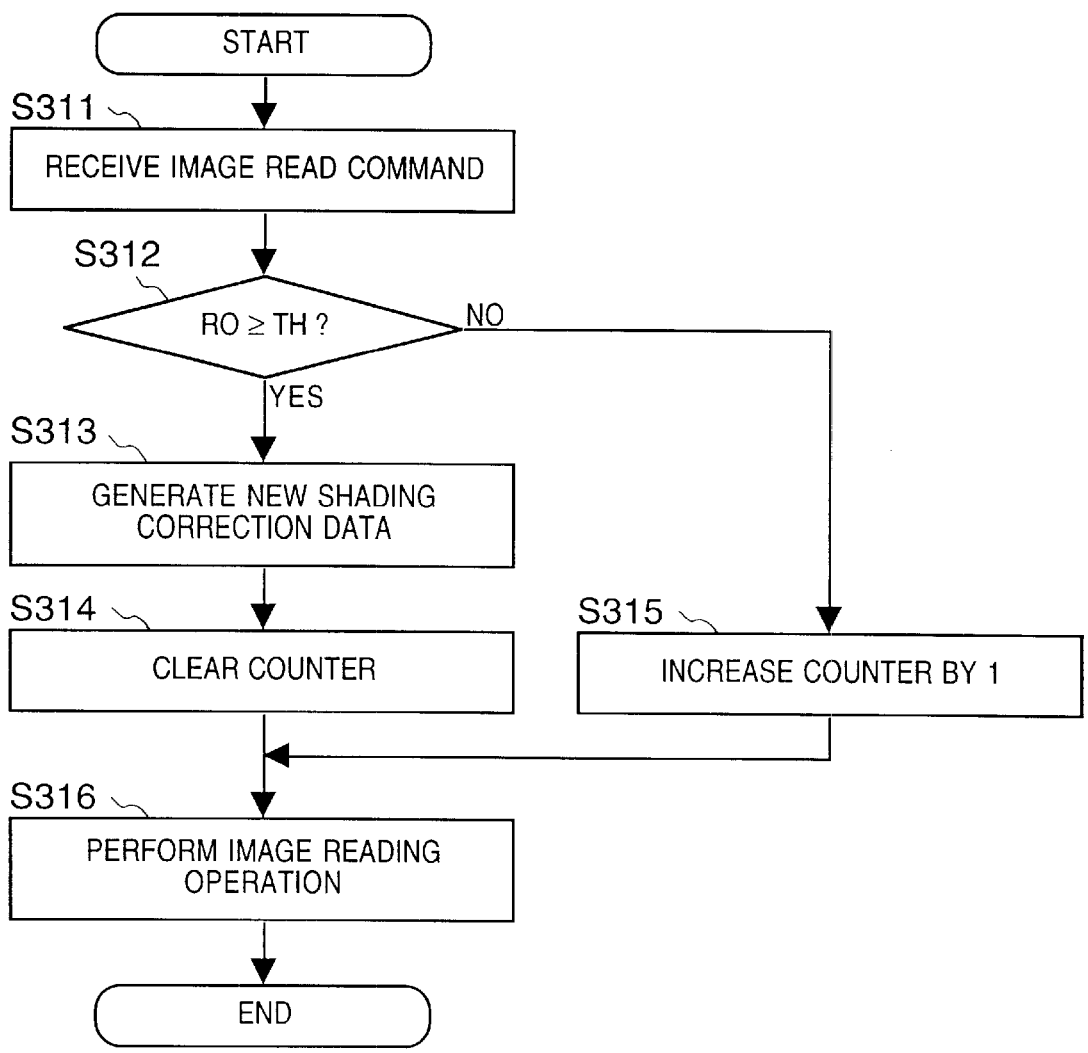
FIG. 8 is a flowchart showing processing operation of the image reading apparatus according to the third embodiment of the present invention.

The control of generating shading correction data is explained with reference to FIG. 8.

When an image read command is transmitted from the host computer 318 to the image reading apparatus (S311), whether or not the number of times (RO) of the image reading operations, including the operation ordered this time, ordered since the shading correction data is generated last time has reached a predetermined reference value (TH) is checked (S312). If RO≧TH, then new shading correction data is generated (S313). Thereafter, a counter for holding the number of times of reading operations is cleared to 0 (S314), then, image reading operation is performed (S316).

Whereas, if RO<TH, then the counter for holding the number of times (RO) of reading operations is increased by 1 (S315), then an image reading operation is performed (S316).

(2) Control Based on Elapsed Time

In the above example, timing of updating the shading correction data is controlled based on the number of times of image reading operations each time an image read instruction is received from the host computer 318, however, the timing of updating the shading correction data may be controlled based on time.

In this case, when the image reading apparatus generates shading correction data at given time, by using an internal clock of the CPU 316 or by executing a program for measuring time using the internal clock, elapsed time since the shading correction data has generated is measured.

Then, each time the image reading apparatus receives an image read command from the host computer 318, the elapsed time from a time when the shading correction data has been generated last time to a time when the command is received is compared to a predetermined reference value. If the elapsed time exceeds the reference value, then new shading correction data is generated.

With the aforesaid control, interval between when an image is read at a given time and when an image is read next is longer than a predetermined period, for instance, even if the number of times of performed image reading operations is small, new shading correction data is generated. Accordingly, a problem in which shading correction is performed under a condition that the quality of shading correction data is deteriorated due to lapse of time is avoided, thereby image reading operation is performed under good conditions.

Figure 9:
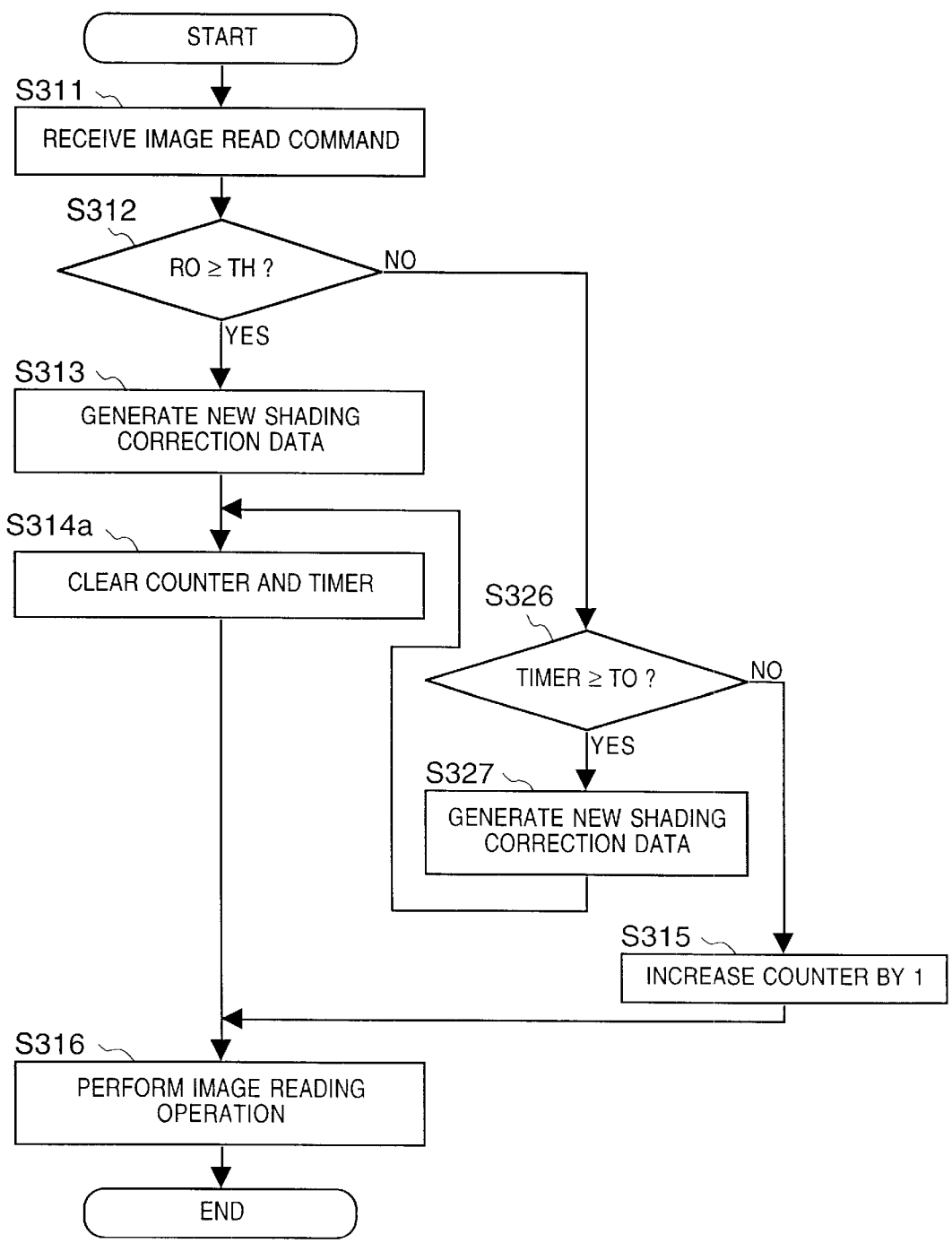
FIG. 9 is a flowchart showing an operation of an image sensing apparatus which performs determination based on both an elapsed period and the number of times of image sensing operations.

(3) Control based on Both the Number of Times of Image Reading operations and Elapsed Time Another control of generating of shading correction data is explained with reference to a flowchart shown in FIG. 9. Note, in the flowchart in FIG. 9, the same processing steps as shown in FIG. 8 a re referred to by the same step numbers, and explanation of them are omitted.

First, after performing steps S311 to S313, a counter for holding the number of times (RO) of image reading operations and a timer for measuring lapse of time (TIMER) are cleared (S314), then, image reading operation is performed (S316).

Whereas, if it is determined in step S312 that RO<TH, then, whether or not time (TIMER) elapsed since the current shading correction data was generated has reached a reference value (T0) is determined (S326). If TIMER≧T0, then, new shading correction data is generated (S327) and the counter for holding the number of times of image reading operations and a value of a timer (TIMER) for measuring elapsed time are cleared (S314). Thereafter, image reading operation is performed (S316).

Whereas, if TIMER<T0, then after performing the process in step S315, image reading operation is performed (S316).

As described above, by controlling generation of new shading correction data in such a manner that comparison of the number of times (RO) of image reading operations, counted since shading correction data was generated last time, with a reference value, and comparison of time elapsed since the shading correction data was generated last time with another pre determined value are performed, and generation of new shading correction data is instructed when either the number of times or the elapsed time has reached the respective reference value, the timing of generating shading correction data is optimized.

(4) Control Based on Determination by User

By providing a mode which enables a user to order to generate shading correction data, the shading correction data is generated any time on the basis of determination by the user independent of the determination by the host computer and the image reading apparatus. In this manner, the determination by the user is reflected in image reading operation.

(5) Control by Host Computer

Figure 10:
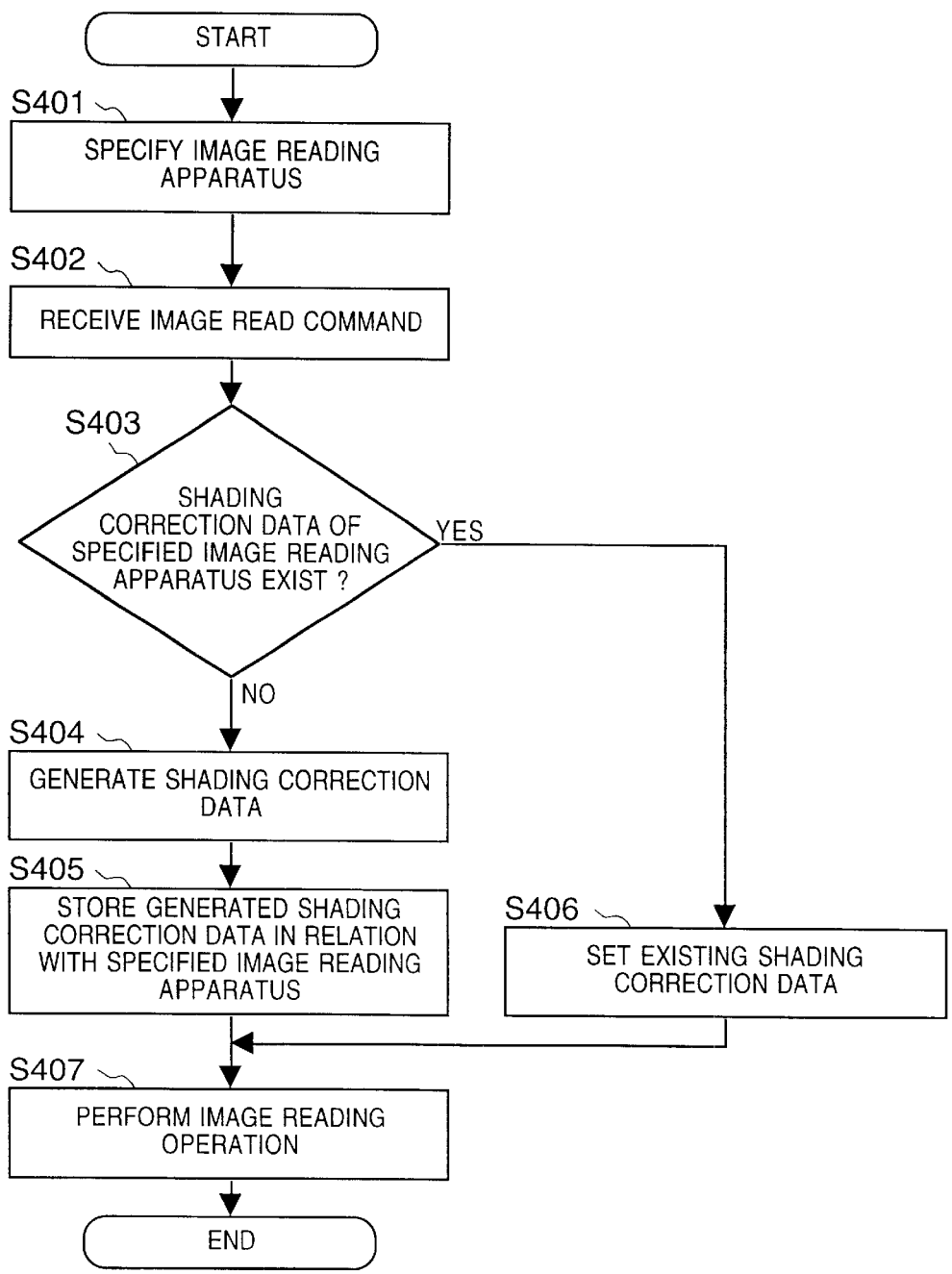
FIG. 10 is a flowchart showing an operational sequence of an image reading method administrated by a host computer.
Figure 11:
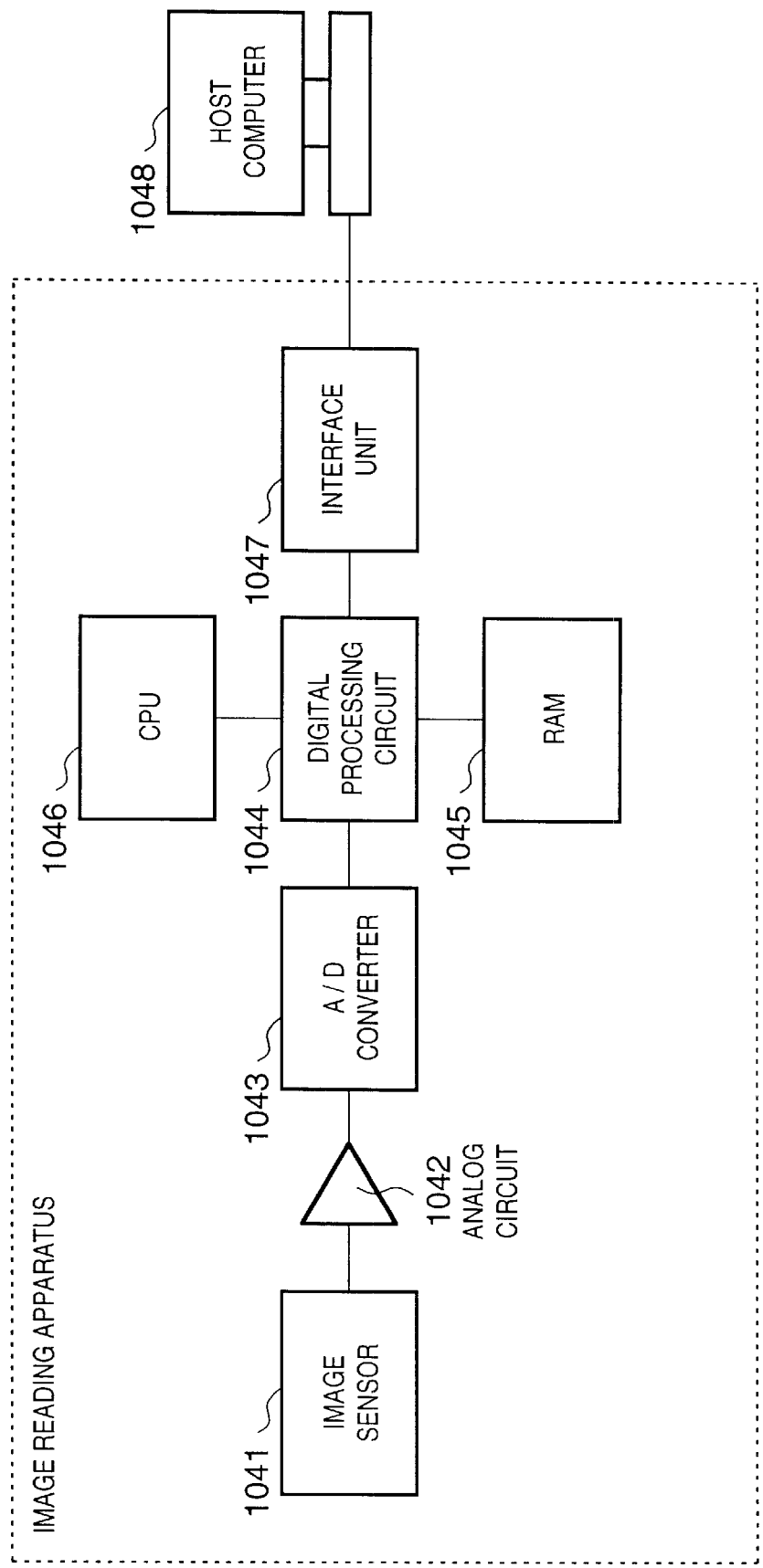
FIG. 11 is a block diagram illustrating a brief configuration of a conventional image reading apparatus.

Next, the control of generating shading correction data is explained with reference to a flowchart shown in FIG. 10.

As shown in FIG. 7, the image reading apparatus according to the third embodiment is connected to the host computer 318, and controlled using commands from driver software (referred to as "driver" hereinafter) installed in the host computer 318.

Note, it is assumed that the driver in the host computer 318 has a function of checking attributes of the image reading apparatus which is currently connected, a function of selecting whether or not the image reading apparatus generates shading correction data, a function of storing shading correction data generated on the basis of image data obtained by the image reading apparatus, and a function of administrating a plurality of image reading apparatuses of various types independently.

First, the host computer 318 receives specific information of the image reading apparatus, such as a serial number, by communicating with the image reading apparatus, and specifies the connected image reading apparatus (S401).

Next, after an image read command is transferred from the host computer 318 to the specified image reading apparatus in response to designation by the user (S402), the host computer 318 determines whether or not the host computer 318 already has shading correction data of the specified image reading apparatus (S403).

If it is determined that the shading correction data does not exist, then the host computer 318 instructs the image reading apparatus to generate shading correction data (S404), then, the generated shading correction data is loaded up to the host computer 318 and stored in relation with the specified image reading apparatus (S405).

Thereafter, an image reading operation is performed (S407).

Whereas, if it is determined that shading correction data of the specified image reading apparatus already exists in the host computer 318, the host computer 318 loads down and sets the shading correction data in the image reading apparatus so as to be used in shading correction (S406), thereafter, an image reading operation is performed (S407).

With the aforesaid control, in a case where a host computer is connectable to a plurality of image reading apparatuses, when an image reading apparatus which has been connected before is connected to the host computer again, it is unnecessary to newly generate shading correction data and shading correction data stored in the host computer is used. Accordingly, it is possible to avoid the waste of generating shading correction data once again.

This control is especially advantageous when a host computer is used by selectively connecting to one of a plurality of image reading apparatuses.

The present invention can be applied to a system constituted by a plurality of devices (e.g., host computer, interface, reader, printer) or to an apparatus comprising a single device.

Further, when the functions of the image reading apparatuses explained in the aforesaid embodiments and modifications are realized as program codes of a software, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program. In this case, the program codes read from the storage medium realize the functions according to the embodiments, and the storage medium storing the program codes constitutes the invention.

In this case, the apparatus or the system operates by reading the program codes stored in a storage medium, such as EEPROM, and executing the program by a CPU. In place of the EEPROM, a floppy disk, a hard disk, an optical disk, a magneto-optical disk, CD-ROM, CD-R, a magnetic tape, a non-volatile type memory card, and ROM may be used.

Furthermore, besides the aforesaid functions according to the above embodiments are realized by executing the program codes which are read by a computer, the present invention includes a case where an OS (operating system) or the like working on the computer performs a part or the entire processes in accordance with designations of the program codes and realize functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus comprising:
   an illumination unit adapted to irradiate light of a plurality of colors which includes at least first and second colors on an object;
   a photoelectric conversion unit adapted to receive light from said object and convert the received light into electric signals;
   an optical unit adapted to guide the light from said illumination unit to said photoelectric conversion unit via said object; and
   a moving unit adapted to relatively and reciprocally move a part or all of said object, said illumination unit, said optical unit, and said photoelectric conversion unit to obtain scan image information;
   wherein, a reference member having a uniform reflection density is used as said object to acquire shading data used for generating shading correction data to correct reading unevenness due to variation in characteristics of said illumination unit, said optical unit, and said photoelectric conversion unit,
   said photoelectric conversion unit reads the light from said reference member irradiated by the light of the first color by said illumination unit while moving in a forward direction by said moving unit to acquire shading data for the first color, and
   said photoelectric conversion unit reads the light from said reference member irradiated by the light of the second color by said illumination unit while moving in a backward direction by said moving unit to acquire shading data for the second color.

2. The apparatus according to claim 1, wherein said illumination unit irradiates light of three primary colors of R, G and B, and, when acquiring the shading data of respective R, G and B components, said reference member is used as said object, and said photoelectric conversion unit reciprocally reads the light from said reference member while light sources for irradiating the R, G and B light are sequentially turned on in synchronization with the reversal of the scanning direction by said moving unit.

3. The apparatus according to claim 1, further comprising an optical color filter for generating light of R, G and B components on a light path from said illumination unit,
   wherein, when acquiring the shading data of respective R, G and B components, said reference member is used as said object, and said photoelectric conversion unit reciprocally reads the light, from said reference member sequentially illuminated by the light of R, G and B components in synchronization with the reversal of the scanning direction by said moving unit.

4. A storage medium for storing program codes which cause a computer to perform the respective means of the image reading apparatus according to claim 1.

5. An image reading apparatus which reads an image of an object by irradiating light of a plurality of colors, which includes at least first and second colors, while a sensor scans said object receiving light from said object and converting the light into electric signals,
   wherein said sensor scans a target area while reversing a scanning direction of said sensor when acquiring shading data of each color, used for generating shading correction data, for correcting reading unevenness due to sensitivity variation on reading elements of said sensor,
   said sensor scans the target area in a forward direction to acquire shading data of the first color, and
   said sensor scans the target area in a backward direction to acquire shading data of the second color.

6. The apparatus according to claim 5, herein the light irradiated on said object is light of three primary colors of R, G and B, and, when acquiring the shading data, the scanning operation is performed in a predetermined direction a same number of times as a number of the primary colors in response to turning-on operation of light sources of the respective colors.

7. The apparatus according to claim 5, wherein light irradiated on said object is light of three primary colors of R, G and B using a predetermined color filter, and, when acquiring the shading data, the shading data of the respective colors is sequentially read in synchronization with the scanning operation, corresponding to the respective colors, in the predetermined direction.

8. An image reading method for reading an image of an object in which said object is illuminated with light of a plurality of colors, which includes at least first and second colors, while a sensor scans said object, light from said object is received and converted into electric signals, said method comprising the steps of:

correcting reading unevenness due to a sensitivity variation on reading elements of said sensor; and controlling scanning operation and reading operation of said sensor so as to scan a target area while reversing a scanning direction of said sensor when acquiring shading data of each color, used for generating shading correction data, wherein the target area is scanned in a forward direction to acquire shading data of the first color, and the target area is scanned in a backward direction to acquire shading data of the second color.

9. The method according to claim 8, further comprising the steps of:

irradiating light of three primary colors of R, G and B on said object; and performing the scanning operation in the scanning direction a same number of times as a number of the primary colors in response to turning-on operation of light sources of the respective colors when acquiring the shading data.

10. The method according to claim 8, wherein light of three primary colors of R, G and B is irradiated on said object, and, when acquiring the shading data, the shading data of the respective colors is sequentially read in synchronization with the scanning operation, corresponding to the respective colors, in the scanning direction.

11. A storage medium for storing program codes which cause a computer to execute the image reading method according to claim 8.

* * * * *

UNITED STATES PATENT AND TRADEMARK OFFICE
CERTIFICATE OF CORRECTION

PATENT NO.        : 6,657,748 B1                                               Page 1 of 1
APPLICATION NO.   : 09/318056
DATED             : December 3, 2003
INVENTOR(S)       : Okita et al.

It is certified that error appears in the above-identified patent and that said Letters Patent is hereby corrected as shown below:

On the Title Page

Item (54) Inventors: should read -- Hisao Okita, Kawasaki (JP); Mitsuru Amimoto, Yokohama (JP). --

Signed and Sealed this

Twenty-third Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 6,657,748 B1
APPLICATION NO. : 09/318056
DATED : December 2, 2003
INVENTOR(S) : Okita et al.

Page 1 of 1

It is certified that error appears in the above-identified patent and that said Letters Patent is hereby corrected as shown below:

On the Title Page

Item (54) Inventors: should read -- Hisao Okita, Kawasaki (JP); Mitsuru Amimoto, Yokohama (JP). --

This certificate supersedes the Certificate of Correction issued October 23, 2007.

Signed and Sealed this

Fifteenth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,657,748 B1 Page 1 of 1
APPLICATION NO. : 09/318056
DATED : December 2, 2003
INVENTOR(S) : Hisao Okita et al.

It is certified that error appears in the above-identified patent and that said Letters Patent is hereby corrected as shown below:

Column 18, Line 18, change "information;" to --information--.

Signed and Sealed this

Twenty-eighth Day of October, 2008

JON W. DUDAS
*Director of the United States Patent and Trademark Office*